US007250381B2

(12) United States Patent
Jaffee

(10) Patent No.: US 7,250,381 B2
(45) Date of Patent: Jul. 31, 2007

(54) FIBROUS NONWOVEN MATS CONTAINING POLYETHERMID FIBERS

(75) Inventor: Alan Michael Jaffee, Bowling Green, OH (US)

(73) Assignee: Johns Manville, Denver, CO (US)

( * ) Notice: Subject to any disclaimer, the term of this patent is extended or adjusted under 35 U.S.C. 154(b) by 294 days.

(21) Appl. No.: 10/987,018

(22) Filed: Nov. 12, 2004

(65) Prior Publication Data

US 2006/0105662 A1 May 18, 2006

(51) Int. Cl.
*B32B 5/02* (2006.01)
*B32B 17/02* (2006.01)

(52) U.S. Cl. ....................... 442/162; 442/163; 442/180

(58) Field of Classification Search .................. 442/59, 442/162, 163, 180; 428/160, 299.4
See application file for complete search history.

(56) References Cited

U.S. PATENT DOCUMENTS 4,897,301 A 1/1990 Uno et al.
5,006,373 A 4/1991 Woodmannsee et al.
5,134,959 A 8/1992 Woodmannsee et al.
5,760,104 A * 6/1998 Gerber ....................... 523/145
2005/0025890 A1* 2/2005 Cheng ..................... 427/372.2
2006/0068675 A1* 3/2006 Handermann et al. ...... 442/415

FOREIGN PATENT DOCUMENTS

EP 0 994 215 A1 4/2000
EP 1 195 198 A2 4/2002

* cited by examiner

*Primary Examiner*—Lynda Salvatore
(74) *Attorney, Agent, or Firm*—Robert D. Touslee

(57) ABSTRACT

Fibrous nonwoven mats comprising polyetherimid fibers and a binder comprising a resin and an adhesion promoter, and method of making the mat are disclosed. These mats have several uses and are particularly suited as facer mats for fiber reinforced thermoplastic thermoformable materials. When used as a facer, the mat bonds to the thermoformable material and provides a resin rich outer layer and facilitates bonding to a decorative cover.

20 Claims, No Drawings

FIBROUS NONWOVEN MATS CONTAINING POLYETHERMID FIBERS

The invention involves nonwoven mats containing polyetherimid fibers particularly useful in bonding to fiber reinforced thermoplastic materials, to serve as a facer for such material, and the method of making the mats. The invention also involves a method of making the mats. The mats of this invention are also useful as reinforcement and dimensional stabilizers for making a large number of inorganic, polymeric and/or natural fibrous web and fiber reinforced plastic laminated products.

BACKGROUND

It is known to make thermoformable sheets comprising glass fibers and a thermoplastic matrix and to thermoform such sheets to form useful products as shown in U.S. Pat. Nos. 4,426,470 and 5,308,565. However, the surfaces of such sheets often cause the surface of parts made from these sheets to show undesirable non-uniformity, particularly coarse fibers. Also, a surface capable of a stronger bond to decorative covers is desired.

It is known to bond a facer mat made from NOMEX® fibers to a fiber reinforced thermoplastic sheet to produce a thermoformable laminate. The facer provides a smoother surface and a surface compatible for decorative covers for thermoformed parts made from such a laminate, but a facer sheet having better flame resistance is desired in the industry.

SUMMARY OF THE INVENTION

The present invention includes a fibrous nonwoven mat for laminating to other mats of the same or similar composition, to mats of different composition and to various other materials that includes fiber reinforced thermoplastic or thermoset sheets, comprising dispersed and crossing polyetherimid fibers bound together with a thermoplastic or thermoset binder containing one or more adhesion promoters. The adhesion promoters include primary amines, amino silanes, n-methylpyrillidone, a water-soluble polyester, novolac resin, and phenoxy resin. The binder content of the mat is typically in the range of about 10-35 percent, more typically in the range of about 10-20 wt. percent, and most typically in the range of about 15-20 wt. percent of the mat. The binder can be any binder known to be useful for binding fibers together in a mat and includes such binders as resins of melamine formaldehyde, phenol formaldehyde, urea formaldehyde, polyvinyl alcohol, polyvinyl acetate, acrylics, polyester, polyvinyl chloride, and mixtures thereof. Typically the binder contains a melamine formaldehyde resin.

The mat can also contain other fibers including glass fibers, ceramic fibers, metal fibers, other synthetic polymer fibers, natural fibers including cotton, wool, and wood fibers, and mixtures of two or more of these fibers. When glass fibers are used, the content is typically in the range of up to about 20 wt. percent of the fibers in the mat, to reduce thermal shrinkage and to improve flame resistance. A greater amount of glass fibers can be used, but the therformability of any thermoformable laminate the mat is attached to will be reduced. Glass fibers are typically a wet chopped fiber product having a chemical sizing thereon, being about 0.2 inch to about 1.5 inches long and having a fiber diameter typically about 10 to about 19 microns. Such products are readily available on the market. These mats, when bonded to a fiber reinforced thermoplastic sheet or other shape as a facer provides a resin rich surface and, when further decoration is desired, also enhances the bonding to decorative cover sheets such as polyvinyl sheets or films, polyester films, decorative foams and other conventional decorative facings. Typically the adhesion promoter is present in the finished mat in amounts of about 20 weight percent based on the weight of the binder.

The polyetherimid fibers used in the present invention typically are unsized, i.e. have unmodified surfaces, but can have a chemical size on the surface to enhance dispersion of the fibers in water water. The sizing typically comprises a silane and a film forming resin, the film forming resin choices including phenoxy, polyvinyl alcohol, polyethylene glycol and others normally used in sizing compositions with a phenoxy resin being exemplary. The polyetherimid fibers typically have a denier in the range of about 1.5 to about 15, more typically from about 3 to about 12 and most typically in the range of about 6 to about 10. The polyetherimid fibers typically are in lengths in the range of about 0.5 inch to about 1.5 inches. Generally, the longer the fiber, the greater the denier, or fiber diameter, should be to achieve good dispersion in the forming water and the resultant facer mat. The basis weight of the facer mat is not critical, but typically is in the range of about 25 to about 250 grams per square meter. Mats of the invention provide a smooth, resin rich surface that enhances lamination of cover sheets, such as decorative sheets, and improved flame resistance. The mats of the invention can also contain pigments, dyes, flame retardants, biocides, fungicides and other functional additives so long as they do not significantly reduce the ability of the mat to bond to the surface of the thermoformable sheets. The pigments or other additives can be included in the fiber slurry or included in the aqueous binder applied to the wet, nonwoven web of fibers.

The invention also includes a method of making the mats comprising dispersing the fibers, polyetherimid fibers alone or mixtures of polyetherimid fibers and other fibers such as glass fibers, in a conventional forming water, metering the dispersed fiber suspension onto a moving forming permeable belt to form a nonwoven web, applying a binder to the wet web, and drying the mat and curing the binder to form the facer mats described above.

The present invention also includes molded laminates containing one or more layers of the mat of the present invention on at least one surface of a fiber reinforced polymeric, thermoplastic or thermosetting, sheet.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed.

Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION

It is known to make reinforcing nonwoven mats from glass fibers and to use these mats as substrates in the manufacture of a large number of roofing and other products. Any known method of making nonwoven mats can be used, such as the conventional wet laid processes described in U.S. Pat. Nos. 4,129,674, 4,112,174, 4,681,802, 4,810,576, and 5,484,653, the disclosures of each being hereby incorporated herein by reference. In these processes a slurry of fiber is made by adding glass fiber to a typical forming water in a pulper to disperse the fiber in the forming water forming a slurry having a fiber concentration of about 0.2-1.0 weight percent, metering the slurry into a flow of white water to dilute the fiber concentration by a factor of about 10:1, and depositing this mixture onto a moving, permeable screen or forming wire to dewater and form a wet nonwoven fibrous web. Usually an aqueous binder is then applied to the wet web, such as with a curtain coater or other known applicator, and the excess binder is removed by a vacuum knife and the resultant wet, bindered web is dried in an oven which heats the mat to a temperature high enough remove the water and to cure the binder. This known process, with modifications as will be described, is used in the invention. Alternative forming methods for making the mat include the use of well known paper or board making processes such as cylinder forming, etc. Dry forming methods can also be used to form the mat, but are not as desirable because of higher costs.

Typical wet forming processes for making mats of the invention comprise forming a dilute aqueous slurry of polyetherimid fibers, and other fibers including glass fibers when desired, depositing the slurry onto an inclined moving screen forming wire to dewater the slurry and form a wet nonwoven fibrous web, and applying an aqueous, resinous binder, typically on machines like a Hydroformer™ manufactured by Voith-Sulzer of Appleton, Wis., or a Deltaformer™ manufactured by North County Engineers of Glenns Falls, N.Y. The wet, bindered web is then transferred to a moving oven wire for drying and curing of the resinous binder to form the facer mat. Typically the finished facer mat is then wound into rolls and packaged for shipment.

EXAMPLE 1

A fiber slurry was prepared in a well known manner by adding 0.5 inch long polyetherimid fibers having unmodified surfaces and a denier of about 10 to a known cationic white water containing Natrosol™ thickening agent available from Hercules, Inc. and a cationic surfactant C-61, an ethoxylated tallow amine available from Cytec Industries, Inc. of Morristown, N.J., as a dispersing agent to form a fiber concentration of about 0.4 weight percent. After allowing the slurry to agitate for about 5 minutes to thoroughly disperse the fibers, the slurry was metered into a moving stream of the same whitewater to dilute the fiber concentration to a concentration averaging about 0.04 weight percent before pumping the diluted slurry to a head box of a pilot sized machine similar to a Voith Hydroformer™ where a wet nonwoven mat was continuously formed.

The wet mat was removed from the forming wire and transferred to a second permeable belt running beneath a curtain coater applicator resembling a Sandy Hill Curtain Coater where an aqueous mixture of melamine formaldehyde resin, a polyamide resin and a urethane resin binder having a solids content of about 20 wt. percent was applied in an amount to provide a binder level in the dry and cured mat of about 18 weight percent. The wet mat was then transferred to an oven belt and carried through an oven to dry the mat and to fully cure the binder resin to a temperature of about 300 degrees F. The dry mat, containing 83 weight percent polyetherimid fiber and 18 percent of binder had a basis weight of about 1 lb./100 sq. ft. The binder, as applied, was an aqueous mixture having about 20 wt. percent solids content, the solids containing 80 wt. percent CRI, a melamine formaldehyde resin available from the Borden Company or Louisville, Ky., 10 wt. percent Hydrosize™ U101, a urethane resin available from Hydrosize Technologies, Inc. of Raleigh, N.C., and 10 wt. percent of GP 2925, a polyamide resin available from the Georgia Pacific Company or Atlanta, Ga., had the following properties:

| | |
|---|---|
| Basis weight (lbs./100 square feet) | 1 |
| Thickness | 27 mils |
| Machine Direction (MD) Tensile | 12.5 lbs./3 inches |
| Cross Machine Direction (CMD) Tensile | 14.1 lbs./3 inches |
| Shrinkage at 625 deg. F. for 2.5 minutes | 35% MD and 38% CMD |

This mat bonded well to the surface of a glass fiber reinforced polypropylene thermoformable sheet and provided a resin rich surface that enhanced the lamination of a decorative cover sheet.

EXAMPLE 2

A mat was made using the procedures used in Example 1 except that the fibers consisted of 90 wt. percent of the same polyetherimid unmodified fibers and 10 wt. percent glass fibers having a nominal length of about 0.75 inch and an average fiber diameter of about 13 microns (K117 fibers available from Johns Manville Corp.), and the binder bonding the fibers together was an aqueous mixture having a solids content of about 20 wt. percent. The solids in the binder contained about 60 wt. percent melamine formaldehyde resin, CRI, about 10 wt. percent of GP 2925 and about 30 wt. percent of Hydrosize™ U101. The dried and cured mat, containing 18 wt. percent binder, had the following characteristics:

| | |
|---|---|
| Basis weight (lbs./100 square feet) | 1 |
| Thickness | 25 mils |
| Machine Direction (MD) Tensile | 14 lbs./3 inches |
| Cross Machine Direction (CMD) Tensile | 13.5 lbs./3 inches |
| Shrinkage at 625 deg. F. for 2.5 minutes | 12% MD and 12% CMD |

This mat had substantially less shrinkage at 625 degrees F. and bonded well to the surface of a glass fiber reinforced polypropylene thermoformable sheet and provided a resin rich surface that enhanced the lamination of a decorative cover sheet.

EXAMPLE 3

This mat was made using the procedure of Example 2 except that the fibers consisted of 80 wt. percent of the same polyetherimid fibers and about 20 wt. percent of the glass fibers used in Example 2. The binder for the fibers had a solids content of about 20 wt. percent and the solids contained 80 wt. percent CRI and 20 wt. percent of Hydrosize™ U1. The binder content in the dried and cured mat was 18 wt. percent and the mat had the following characteristics:

| | |
|---|---|
| Basis weight (lbs./100 square feet) | 1.1 |
| Thickness | 28.5 mils |
| Machine Direction (MD) Tensile | 19 lbs./3 inches |
| Cross Machine Direction (CMD) Tensile | 22 lbs./3 inches |
| Shrinkage at 625 deg. F. for 2.5 minutes | 7% MD and 6.5% CMD |

This mat had substantially less shrinkage at 625 degrees F. than the mat of Examples 1 and 2 and bonded well to the surface of a glass fiber reinforced polypropylene thermoformable sheet and provided a resin rich surface that enhanced the lamination of a decorative cover sheet. The resultant laminate was more suited to shallow draw molding due to the higher content of glass fibers on the surface.

The length and diameter of the glass fibers used in the invention can be selected based on the intended application and desired properties of the facer mat. Typical lengths are within the range of about 0.125 to about 3 inches, more typically in the range of about 0.2 to about 1.5 inches and most typically in the range of about 0.5 to about 1 inch. Typical average fiber diameters of the glass fibers will be in the range of about 6 to about 23 microns, more typically in the range of about 8 to about 19 microns and most typically in the range of about 10 to about 16 microns. Any type of glass fiber can be used, but E glass is most plentiful in commercial products and is preferred for most applications. Generally, the greater the fiber diameter and the longer length of the fibers, the stiffer will be the resultant mat and vice versa. The use of smaller diameter and shorter fibers provide a more flexible mat and more fibers per unit area, and better hiding power.

The mats of the present invention may be hot molded alone as one or more layers or hot molded in combination with other materials of all kinds suitable for molding. Some of these moldable materials are fiber reinforced thermoplastics including polypropylene, polyethylene and polyimide. The reinforcing fibers are typically glass fibers, but other fibers such as ceramic fibers, polymer fibers, carbon fibers, metal fibers and natural fibers including wood fibers. The mat of the present invention bonds particularly well to glass fiber reinforced polyimide materials. When the mats of the present invention are used on one or both surfaces of one or more layers of other material and hot molded, the resulting laminate will have a smooth, resin-rich, surface with the remainder of the laminate having the properties of the core material or materials used. The mats of the invention can also be used, when desired, as one or more interior layers of a laminate.

Hot molding and stamping are well known and it is also well known to preheat the mat(s) or laminate core sandwich to reduce molding time. When hot molding a mat of the invention alone, or as part of a laminate, to a three dimensional shape, it is preferred to first heat the inventive mat layer(s) to a temperature sufficient to soften or melt the novolac resin in the mat before deforming to the desired shape, either in the mold or before entering the mold, then molding to the desired shape. If desired, the mat or laminate can be further heating to a sufficient temperature to react the cross-linking agent with the novolac to crosslink and form a thermoset bond in the resin in the mat(s) of the laminate. When a phenolic novolac is used in the mat a final temperature of about 193 degrees C. (380 degrees F.) for about 1 minute is satisfactory. Higher final temperatures will shorten the time required to reach complete cure, but can darken the novolac color if too high.

Numerous modifications can be made to the embodiments disclosed above and in the examples. As some examples, one can modify the type of fibers used with the polyetherimid fibers, the type and/or the amount of binder, the orientation of the fibers and the basis weight of the mat to achieve the desired level of moldability, hiding power, shrinkage and strength in the molded laminate. Various known pigments, fillers, and other known additives can be incorporated into the mat by addition to either the forming water or to the aqueous binder or cross linking solution or slurry for the function they are known to provide. The invention as defined by the claims following includes such obvious modifications.

The invention claimed is:

1. A nonwoven fiber mat comprising polyetherimid fibers bonded together at the locations where the fibers cross each other with about 15-35 weight percent of a resinous binder comprising melamine formaldehyde resin and urethane resin, based on the dry weight of the mat.

2. The mat of claim 1 wherein the urethane resin is present in an amount in the range of about 15 to about 30 wt, percent of the binder.

3. The mat of claim 1 wherein the binder includes an adhesion promoter.

4. The mat of claim 2 wherein the binder includes an adhesion promoter.

5. The mat of claim 1 wherein the binder includes an adhesion promoter selected from the group consisting of primary amines, amino silanes, n-methylpyrillidone, a water-soluble polyester, novolac resin, and phenoxy resin.

6. The mat of claim 2 wherein the binder includes an adhesion promoter selected from the group consisting of primary amines, amino silanes, n-methylpyrillidone, a water-soluble polyester, novolac resin, and phenoxy resin.

7. The mat of claim 1 wherein the mat also comprises glass fibers.

8. The mat of claim 2 wherein the mat also comprises glass fibers.

9. The mat of claim 3 wherein the mat also comprises glass fibers.

10. The mat of claim 4 wherein the mat also comprises glass fibers.

11. The mat of claim 5 wherein the mat also comprises glass fibers.

12. The mat of claim 6 wherein the mat also comprises glass fibers.

13. The mat of claim 1 wherein the mat comprises from 0 to about 25 wt. percent, based on the total weight of fibers in the mat, of fibers selected from a group consisting of glass fibers, ceramic fibers, mineral fibers, carbon fibers, synthetic polymer fibers and natural fibers and about 15 to about 20 wt. percent of binder comprising melamine formaldehyde resin and an adhesion promoter.

14. The mat of claim 13 wherein the adhesion promoter is selected from the group consisting of primary amines, amino silanes, n-methylpyrillidone, a water soluble polyester, novolac resin, and phenoxy resin.

15. The mat of claim 13 wherein the binder also comprises urethane resin.

16. The mat of claim 14 wherein the binder also comprises urethane resin.

17. A mat comprising fibers, a major portion of the fibers being polyetherimid fibers, and about 15-35 wt. percent of a binder comprising melamine formaldehyde resin, urethane resin and an adhesion promoter selected from the group consisting of primary amines, amino silanes, n-methylpyrillidone, a water soluble polyester, novolac resin, and phenoxy resin.

18. The mat of claim 17 wherein the urethane resin is present in an amount of about 15 to about 30 wt. percent of the binder.

19. The mat of claim 17 wherein the mat also comprises from 0 to about 25 wt. percent, based on the total weight of fibers in the mat, of fibers selected from a group consisting of glass fibers, ceramic fibers, mineral fibers, carbon fibers, synthetic polymer fibers.

20. The mat of claim 18 wherein the mat also comprises from 0 to about 25 wt. percent, based on the total weight of fibers in the mat, of fibers selected from a group consisting of glass fibers, ceramic fibers, mineral fibers, carbon fibers, synthetic polymer fibers.

* * * * *